United States Patent [19]

Stephenson et al.

[11] Patent Number: 5,003,449
[45] Date of Patent: Mar. 26, 1991

[54] LIGHT FIXTURE WITH SECONDARY REFLECTOR

[75] Inventors: James G. Stephenson, Kalamazoo; William F. Lohness, Jonesville, both of Mich.

[73] Assignee: Progressive Dynamics, Inc., Marshall, Mich.

[21] Appl. No.: 497,265

[22] Filed: Mar. 22, 1990

[51] Int. Cl.⁵ .............................................. F21V 7/20
[52] U.S. Cl. .................................. 362/346; 362/297; 362/304
[58] Field of Search ............... 362/297, 304, 341, 343, 362/346, 347, 349

[56] References Cited

U.S. PATENT DOCUMENTS

| 1,550,477 | 8/1925 | White | 362/297 |
| 1,610,025 | 12/1926 | Mentzer | 362/297 |
| 1,624,166 | 4/1927 | Enderes | 362/297 |
| 2,142,467 | 1/1939 | Waterbury | 362/297 |
| 3,610,915 | 10/1971 | Moore | 362/297 |

Primary Examiner—Ira S. Lazarus
Assistant Examiner—Sue Hagarman
Attorney, Agent, or Firm—Beaman & Beaman

[57] ABSTRACT

The invention relates to an improvement in light fixtures of the type having a base, a socket receiving a bulb, and a primary reflector defined on the base located in relatively close proximity to the bulb. The improvement consists of a secondary reflector located between the primary reflector and the bulb. The secondary reflector is closely spaced from the primary reflector defining an air gap therebetween. The secondary reflector provides dispersion of concentrated heat produced by the bulb to maintain the primary reflector at a lower temperature whereby the air gap reduces heat transfer between the reflectors, and the secondary reflector is formed of a reflective material to provide improved light reflectance qualities.

5 Claims, 1 Drawing Sheet

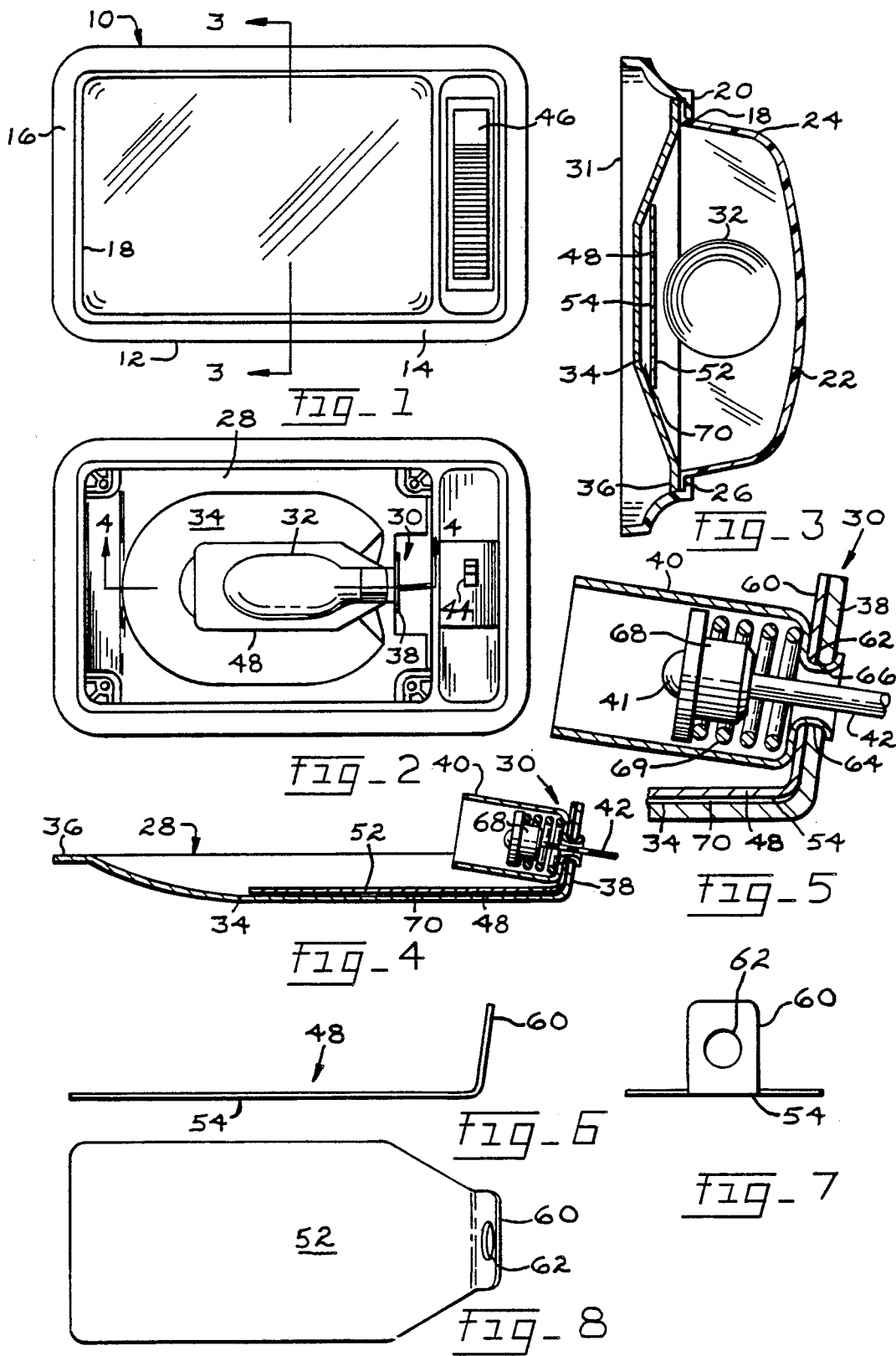

LIGHT FIXTURE WITH SECONDARY REFLECTOR

BACKGROUND OF THE INVENTION

Light fixtures commonly mounted upon ceilings and walls, particularly of the type used in recreational vehicles such as trailers, motor homes, and boats, are usually constructed under concise dimensional requirements and are usually injection molded of synthetic plastic material. Usually, such light fixtures include a base, a bulb socket receiving an incandescent light bulb, and a reflector defined on the synthetic base located in close proximity to the bulb to focus and disperse the light. The reflector also functions as a heat reflector to protect the light fixture from the heat produced by the bulb.

Usually, the reflector is formed of a thin piece of sheet metal into a dish-shape type configuration which has high reflectance qualities and is economical to manufacture and easy to assemble to the fixture. However, because the bulb must be located in relatively close proximity to the reflector and the base, the heat imposed on the reflector and base, even when employing low wattage bulbs, has been known to damage the synthetic plastic base.

It is an object of the invention to provide a secondary reflector for a light fixture having a reflector located in relatively close proximity to the bulb wherein the secondary reflector is located intermediate the primary reflector and the bulb to provide dispersion of concentrated heat from the light bulb to maintain the primary reflector at a lower temperature.

Another object of the invention is to provide a secondary reflector for light fixtures constructed under concise dimension requirements and low cost constraints wherein the secondary reflector is economically manufactured, easily assembled to the light fixture, provides improved light reflectance qualities, and does not add to the overall dimensions of the light fixture.

Yet another object of the invention is to provide a secondary reflector for light fixtures having a primary reflector located in close proximity to the bulb wherein the secondary reflector includes a thin body portion located intermediate the bulb and primary reflector but is closely separated from the primary reflector defining an air gap therebetween which provides a thermal barrier and reduces heat transfer from the secondary reflector to the primary reflector.

In the practice of the invention a light fixture usually includes a molded synthetic plastic base adapted to be mounted to a support structure such as a wall or ceiling, a bulb socket receiving an incandescent bulb, a primary reflector defined on the base located in close proximity to the bulb to reflect the light and heat produced by the bulb, and a translucent lens mounted on the base. Usually, the primary reflector is of a dish-shaped configuration and includes an upstanding portion to which the socket is mounted.

A secondary reflector in accord with the invention includes a relatively thin body having an extension which is mounted to the primary reflector such that the body is located intermediate the primary reflector and the bulb and is slightly separated from the primary reflector defining an air gap between the reflectors. A bore is defined on the extension which receives a terminal to mount the secondary reflector to the primary reflector, and the same terminal may be utilized to mount the socket to the primary reflector.

The secondary reflector provides dispersion of concentrated heat produced by the bulb to maintain the primary reflector at a lower temperature than would otherwise exist as the air gap reduces heat transfer from the secondary reflector to the primary reflector. The secondary reflector is economically formed of a thin piece of metal so as not to add to the overall dimension of the light fixture, and the metal is of the reflective type to provide improved light reflectance qualities in the light fixture. The particular configuration and dimensions of the secondary reflector may vary, but, preferably, the overall length and width of the body will be just slightly greater than the dimensions of the bulb to provide effective heat shielding while maintaining a minimum overall dimension for cost efficiency.

As the secondary reflector may be economically formed of thin metal and easily assembled, a light fixture meeting concise dimension requirements, low cost constraints, and which significantly reduces the risk of damage to the fixture base from excessive heat is achieved. Also, as the secondary reflector provides additional heat protection without adding to the overall dimensions of the light fixture, the secondary reflector permits employment of higher wattage bulbs in concise light fixtures than would otherwise be possible without the risk of damage from excessive heat.

BRIEF DESCRIPTION OF THE DRAWINGS

The aforementioned objects and advantages of the invention will be appreciated from the following description and accompanying drawings wherein:

FIG. 1 is an elevational view of a complete light fixture incorporating the concepts of the invention, FIG. 2 is a view similar to FIG. 1 except that the lens and switch cover have been removed to illustrate the primary and secondary reflector combination in accord with the invention, FIG. 3 is an elevational, sectional view as taken along Section 3—3 of FIG. 1, FIG. 4 is an elevational, sectional view as taken along Section 4—4 of FIG. 2, FIG. 5 is an enlarged, detail sectional view illustrating the reflectors assembled to the bulb socket, FIG. 6 is a side elevational view of a secondary reflector, per se, constructed in accord with the invention, FIG. 7 is an end elevational view of the reflector of FIG. 6 as taken from the right thereof, and FIG. 8 is a plan view of the reflector of FIG. 6.

DESCRIPTION OF THE PREFERRED EMBODIMENT

A typical light fixture, generally indicated at 10, incorporating the inventive concepts employs a synthetic plastic injection molded base 12 of a generally rectangular configuration having lateral sides 14, ends 16, and a generally rectangular lens-receiving opening 18 formed by a flange 20. A lens 22, usually translucent, is of a concave-convex configuration including sides 24 and lateral edges extending outwardly to define a lip 26 which is received under the flange 20 to mount the lens within the opening. A primary reflector 28 is mounted to the base and receives a bulb socket assembly generally indicated at 30 which supports a bulb 32. The base 12 includes a bottom edge 31 which is usually mounted to a support structure, not shown, such as wall or ceiling, and the primary reflector 28 reflects and disperses the light and protects the base and support surface from the heat generated by the bulb.

The primary reflector 28 includes a concave surface 34, a lip 36 which is affixed to the base 12 and an upstanding portion 38 to which a bulb socket 40 is mounted and the bulb 32 is received therein. The bulb socket is grounded and the socket central terminal 41 is electrically connected by wire 42 to a power supply, not shown, through a switch 44, FIG. 2. A slide switch operator cover 46, FIG. 1, is superimposed over the switch 44 to facilitate turning the bulb on and off.

A secondary reflector 48 in accord with the invention is located between the bulb 32 and primary reflector 28 and includes a thin elongated body 50 of a generally flat configuration having an inner surface 52 and an outer surface 54. The body 50 also includes lateral edges 56, an end edge 58, and an extension 60 transversely extends from the body 50 and is provided with a hole 62 to receive the socket sleeve to mount the secondary reflector to the primary reflector portion 38.

As will be best appreciated in FIGS. 4 and 5, the primary reflector's upstanding portion 38 is provided with a hole 64 and to assemble the primary reflector 28, secondary reflector 48 and the socket 40 the holes 62 and 64 are aligned and the socket's cylindrical extension sleeve 66 is inserted through the aligned holes. The sleeve 66 is homogeneously formed of the metal of the socket and its end is roll staked over the portion 38 to produce a tight assembly of the three components. An insulated adapter 68 is located within the socket 40 and is biased outwardly by a spring 69. The terminal 41 is mounted on the end of the conductor wire 42 which extends through the extension sleeve 66 and adapter, as shown. As well known, the bulb 32 is retained in the socket by the usual bayonet connections so that the bulb base terminal will engage the terminal 41.

The secondary reflector 48 is mounted such that its body 50 is located intermediate the bulb 32 and primary reflector 28 and the outer surface 54 is separated from the primary reflector's surface 34 defining an air gap 70 between the reflectors, FIGS. 3, 4 and 5. The air gap 70 is a result of the concave shape of the base and the flat configuration of the body 50, and the body edges 56 engage the base as apparent in FIG. 3.

The purpose of the secondary reflector 48 is to provide dispersion of concentrated heat from the bulb 32 so that the primary reflector 28 may be kept at a lower temperature, and the air gap 70 reduces heat transfer from the secondary reflector 48 to the primary reflector 28 The secondary reflector 48 is preferably formed of stamped metal, and, preferably, the metal will be of the reflective type to provide improved reflectance qualities. However, the secondary reflector may be formed of a non-reflective metal, and, if desired, the surface 52 may be coated with a reflective material.

The overall dimensions of the secondary reflector may vary, but, preferably, for cost efficiency, the dimensions will be kept to the minimum allowable in order to still provide sufficient heat dispersion to maintain the temperature of the primary reflector below the maximum allowable level. For instance, the width of the secondary reflector 48, as defined by the lateral edges 56, is slightly greater than the maximum width of the bulb while the length of the reflector as defined by the distance between the end edge 58 and extension 60 is a little greater than the length of the bulb. Thus, the secondary reflector forms a "heat shield" where the heat produced by the bulb is the most concentrated.

The secondary reflector provides an advantage in light fixtures constructed under concise dimension requirements wherein the primary reflector is located in close proximity to the bulb in that the secondary reflector maintains the primary reflector at lower temperatures thereby significantly reducing the possibility of damage to the base or support surface from excessive heat.

It is appreciated that various modifications to the inventive concept may be apparent to those skilled in the art without departing from the spirit and scope of the invention.

We claim:

1. A light fixture characterized by its double reflector assembly comprising, in combination, a base, a primary reflector defined on the base having a concave surface and an upstanding portion, a bulb socket mounted on said reflector upstanding portion receiving a bulb, said bulb being located in proximity to said primary reflector's concave surface, a secondary reflector having a generally flat elongated thin body having ends and lateral edges and including an inner surface and an outer surface, an extension defined on an end of said secondary reflector, and fastening means fastening said extension to said primary reflector upstanding portion whereby said secondary reflector's inner surface extends toward said bulb and said outer surface extends toward said primary reflector's concave surface.

2. In a light fixture as in claim 1, wherein said secondary reflector's inner surface is formed of a reflective material.

3. In a light fixture as in claim 1, said fastening means comprising a sleeve defined on said socket passing through said extension and said upstanding portion and deformed over said upstanding portion, said secondary reflector extension being locked between said bulb socket and said upstanding portion.

4. In a light fixture as in claim 1, wherein said secondary reflector's outer surface is separated from said primary reflector's surface defining an air gap therebetween.

5. In a light fixture as in claim 4, said secondary reflector lateral edges engaging said primary reflector's concave surface.

* * * * *